No. 866,618. PATENTED SEPT. 24, 1907.
M. A. BRANNON.
ELECTRIC WATER FILTER.
APPLICATION FILED APR. 11, 1906.
3 SHEETS—SHEET 1.
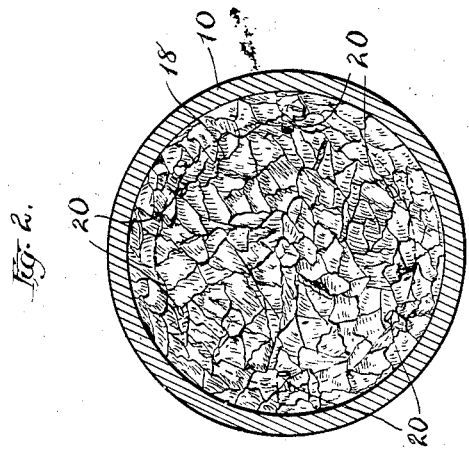
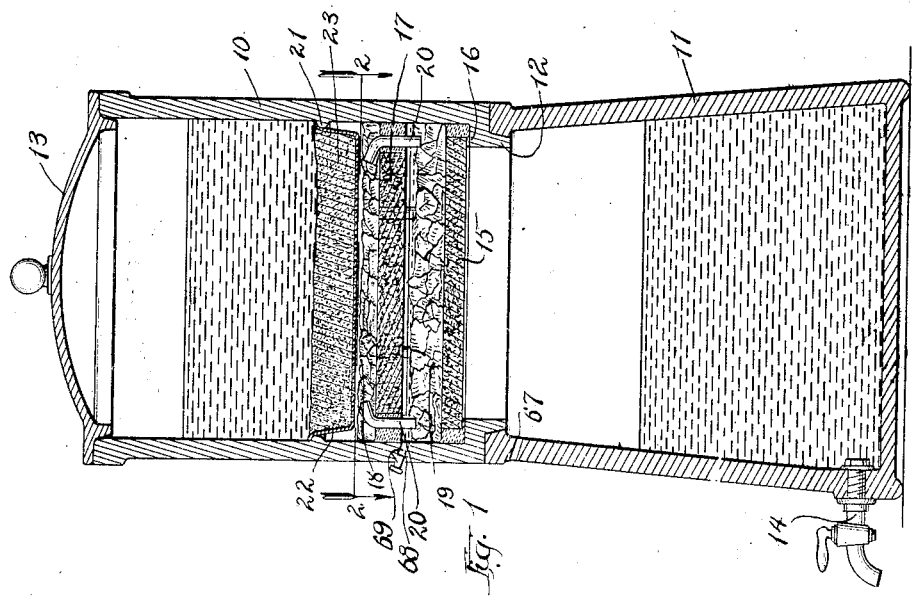
Witnesses:
Inventor:
Melvin A. Brannon
By Peirce & Fisher
Attys.

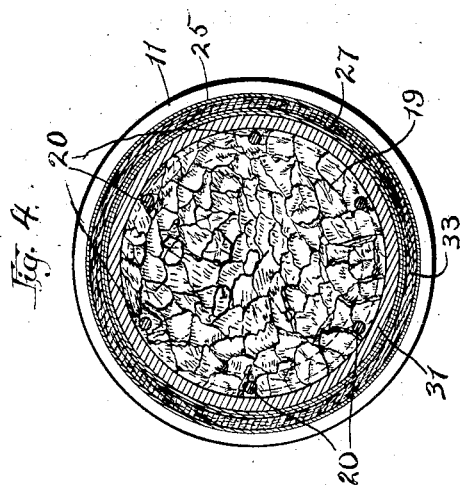
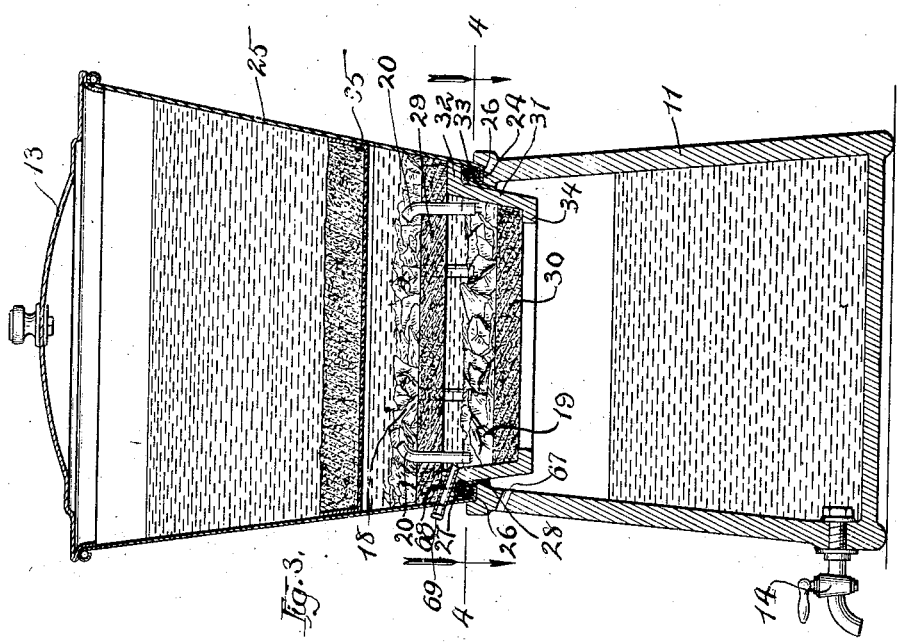

No. 866,618. PATENTED SEPT. 24, 1907.
M. A. BRANNON.
ELECTRIC WATER FILTER.
APPLICATION FILED APR. 11, 1906.
3 SHEETS—SHEET 3.
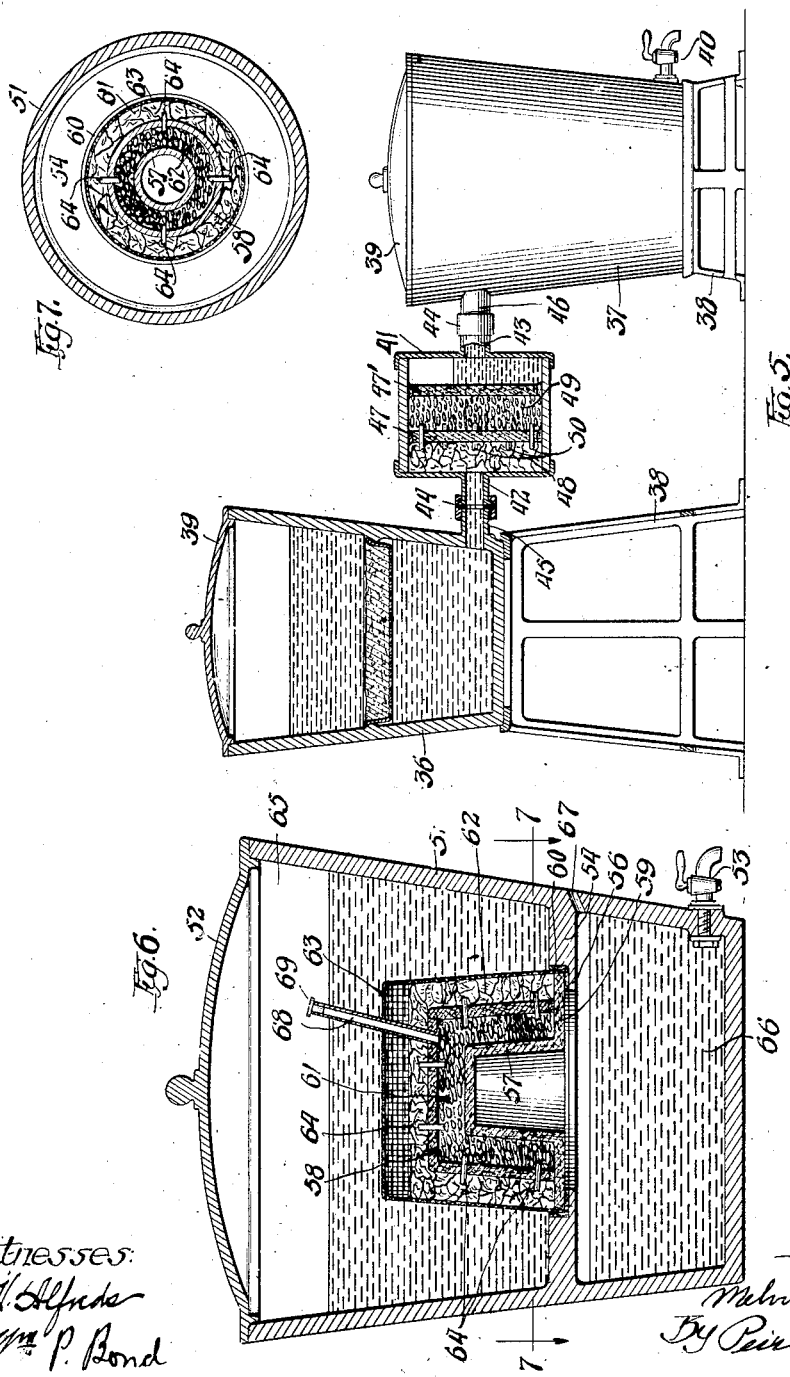
Witnesses:
Inventor
Melvin A. Brannon
By Peirce & Fisher
Attys.

UNITED STATES PATENT OFFICE.

MELVIN A. BRANNON, OF GRAND FORKS, NORTH DAKOTA.

ELECTRIC WATER-FILTER.

No. 866,618.    Specification of Letters Patent.    Patented Sept. 24, 1907.

Application filed April 11, 1906. Serial No. 311,055.

*To all whom it may concern:*

Be it known that I, MELVIN A. BRANNON, a citizen of the United States, and a resident of Grand Forks, county of Grand Forks, State of North Dakota, have invented certain new and useful Improvements in Electric Water-Filters, of which the following is declared to be a full, clear, and exact description.

The invention relates to an electric filter for drinking water and seeks to provide a simple and effective construction for household use that cannot readily get out of order and by which all bacteria in the water are gotten rid of or destroyed and the water thus sterilized through the action of an electric couple that is not dependent upon any battery or like external source of current.

With these objects in view, the invention consists in the features of construction, combinations and arrangements of parts hereinafter set forth, illustrated in the accompanying drawings and more particularly pointed out in the appended claims.

In the drawings, Figure 1 is a vertical section of one form of the improved filter. Fig. 2 is a cross section thereof on line 2—2 of Fig. 1. Fig. 3 is a vertical section of a modified form of the improved filter. Fig. 4 is a cross section on line 4—4 of Fig. 3. Figs. 5 and 6 are vertical sections of still further modifications. Fig. 7 is a sectional view on lines 7—7 of Fig. 6.

The improved filter preferably comprises an upper water-receiving chamber and a lower chamber for the filtered water. These chambers may be formed in one vessel or in two separate vessels and are arranged one above the other for gravity flow of the water from the upper receiving chamber to the lower holding chamber or reservoir. In the forms shown in Figs. 1 and 2, the chambers are formed by two separate vessels 10 and 11, that are preferably formed of stone or glazed pottery and the upper vessel is provided with a depending lip or flange 12 snugly fitting within the open upper end of the lower reservoir 11. The upper vessel may be provided with a suitable cover 13 and the lower reservoir or vessel for filtered water is provided with a cock or faucet 14 at one side of its bottom portion. The electric couple for the treatment of the water is supported in position between the upper and lower vessel so that the water is compelled to pass therethrough by gravity.
This couple comprises finely divided electro-positive and negative elements that are separated one from the other by a porous filter partition, but are placed in electrical connection by a suitable conductor. Preferably, the positive and negative elements are arranged in or supported upon the lower end of the upper vessel where two vessels are employed.

In the form shown in Figs. 1 and 2, a filter partition or disk 15, preferably formed of porous porcelain or like unglazed earthenware, is arranged within the lower end of the upper vessel 10 upon a shoulder 16 thereof. A second porous porcelain disk 17 is arranged in the upper vessel 10 above the porous disk 15. Disk 17 is separated or spaced apart from the disk 15 and both disks are preferably securely cemented in place.
The negative element preferably consists of zinc fragments or scraps 18 placed upon the upper disk 17. The positive element preferably comprises copper turnings, filings or scraps 19 arranged between the disks. Other suitable negative and positive electric elements can be employed, for example, finely divided pieces of carbon could be used in place of the copper turnings. The positive and negative elements are placed in electrical connection by a suitable conductor. Preferably, a series of short copper rods 20 are employed that extend through the upper disk 17 or through the cement at its periphery. The projecting ends of the rods 20 extend within the zinc fragments and copper turnings on opposite sides of the disk or plate 17. In use, the water to be filtered, as with an ordinary filter, is placed in the receiving vessel 10 and flows therefrom by gravity through the elements of the electric couple and through the porous partitions or disks 15 and 17. These partitions or disks are snugly fitted and secured within the vessel 10 and compel the passage of water through the elements of the electric filter. Ordinary well and river water, such as is usually employed for drinking purposes, contain sufficient mineral salt to act upon the elements of the couple and thus generate a flow of current through the water as it slowly passes from the upper vessel through the disks into the lower receiving reservoir. Bacteriological tests of water treated in the improved filter show that all germs are effectively destroyed and the water thus thoroughly sterilized.

The upper reservoir 10, in the form shown in Fig. 1, is provided, above the electric couple, with an inwardly projecting shoulder 21 upon which may be supported a metal tray 22 having a perforated bottom and arranged to hold a body of sand 23. The sand tray is employed in the filter above the electrical couple where the water to be filtered contains mineral and organic matter.

In the form shown in Figs. 3 and 4, the lower vessel or reservoir 11 is similar to that shown in Fig. 1, except that it is provided at its upper edge with an annular recess 24 within which the upper vessel 25 extends. This upper reservoir 25 is formed of galvanized or tinned sheet metal and is provided at its lower end with an inwardly extending flange 26 having an upwardly projecting shoulder 27 and a downwardly projecting lip 28, that fits within the open upper end of the lower vessel 11. In this form, the upper and lower porous partitions or disks 29 and 30 are carried upon a holder 31 of glazed pottery or stone ware. This holder is arranged within the open bottom of the upper vessel 25 and is provided at its upward end with an outwardly projecting flange 32 that rests upon a ring of packing material 33 held in place by the flange 26 and shoulder 27 at the lower portion of the upper vessel 25. The upper disk 29 rests upon the shoulder 32 and the lower disk 30 rests upon an inwardly extending flange or shoulder 34 at the lower end of the holder 31. If desired, the disks may be cemented or otherwise secured to the holder 31. The zinc fragments 18 and copper turnings 19, or other negative and positive elements, are arranged as before upon the upper and lower partitions or disks, and are placed in electrical connection by a series of copper conducting rods 20 extending through the upper disk 29. The upper vessel 25 is preferably conical or tapering toward its lower end and the sand tray 35 is of sufficient size to fit the vessel and be held in place at a point above the electrical couple. In this form, the parts of the electric couple may be removed from the filter and cleared and renewed by boiling. A tight joint is maintained by the packing 33 between the holder 31 and the body of the vessel so that the water must pass through the porous disks 29 and 30 through the negative and positive elements thereon.

In the form shown in Fig. 5, the water-receiving and holding vessels 36 and 37 are formed of glazed stoneware or of galvanized or tinned sheet metal and are mounted upon suitable supports or legs 38 arranged to support the receiving vessel 36 above the holding vessel 37. Each of the vessels may be provided with a removable cover 39 and the lower vessel with a draw-off cock 40. The electric couple in this form, is carried in a separate receptacle or holder 41 that is preferably formed of glazed porcelain or other liquid tight insulating material. The holder 41 is provided with inlet and outlet pipes 42 and 43 that are connected by couplings 44 to nipples 45 and 46 leading respectively from the lower end of the upper and into the upper end of the lower vessel. The porous filter disks or partitions 47 and 47' are arranged centrally within the holder or receptacle 41 and the zinc fragments and copper scraps or filings 48 and 49 are arranged on opposite sides of the disk 47 within the holder or receptacle. As before, proper conducting wires 50 extend through the disk and electrically connect the positive and negative elements of the couple.

In the form shown in Figs. 6 and 7 the single vessel 51 of glazed stoneware or pottery is employed. The vessel is provided with a suitable cover 52 and a draw-off cock 53 at its lower end. The side wall of the vessel 51 is provided with an inwardly projecting flange 54 having at its inner edge a lip 56 for supporting the electric filter couple. In this form the porous filter partitions 57 and 58 are substantially cylindrical or inverted cup-shaped and are fitted one within the other as shown. At their lower edges they are cemented in an annular piece 59 of glazed porcelain that rests upon the annular lip 56 of the flange 54. The part 59 may be cemented to the annular flange 54 but the filtering couple is preferably removable from the vessel 51 and to form a tight joint, a gasket 60 of rubber or other suitable material, is interposed between the part 59 and the flange 54. The copper filings 61 are arranged between the filtering partitions 57 and 58 and the zinc fragments 62 are arranged about the outer filtering partitions 58, being held in place by a suitable guard member 63 surrounding the filter partitions. The elements of the couple are placed in electrical connection by the copper conductors 64 extending through the partition 58. In this form the filtering partitions divide the vessel 51 into an upper receiving chamber 65 and the lower holding chamber 66 for filtered water, both being arranged within the vessel.

In the form shown in Figs. 1, 3 and 6, vent openings 67 are provided with the walls of the vessel leading from the upper end of the lower chamber, and vent openings 68 are provided leading from the upper portion of the space between the two filtering partitions. These vent openings permit the escape of air so as to quicken the filtering action. Rubber plugs 69 or other suitable means are provided for closing the vent openings 68 after the space between the filtering partitions is filled with water. Plugs may also be provided for closing the vent openings 67 if desired.

In all the forms described, the water is exposed to the electric current while it is passing through the porous filter partition between the positive and negative elements of the couple. Water passes very slowly through the microscopic pores of the filter partition formed of porous porcelain or like suitable material, so that it is exposed for a considerable length of time to the action of the slight current generated. The second porous filter partition also serves to retard the passage of the water through the field of the couple, and all portions of the water must pass through such field and thus insures the destruction of all germs. Tests have shown that the improved filter is particularly efficacious for destroying any typhoid germs that may be present in the water. The current generated by the action of the electric couple, is not dependent upon any battery or other source that might readily get out of order. For this reason, and since the filter is of simple construction and comprises few parts, it is particularly adapted for domestic purposes and for use by unskilled persons. With an electric couple of the sort defined, and particularly when formed as is preferable, of divided positive and negative elements, will generate a large number of small currents throughout the field occupied by the water as it passes slowly through the porous filter disk, so that every portion of the filtered water is thoroughly subjected to the sterilizing action of the couple.

It is obvious that numerous changes may be made in the details of construction without departure from the essentials of the invention.

Having described my invention, what I claim as new and desire to secure by Letters Patent is:—

1. An electric water filter comprising upper and lower, water receiving and holding chambers arranged one above the other for gravity flow from the upper to the lower chamber, and an electric couple and a body of filtering material supported in position between said chambers to compel the passage of water therethrough, said couple comprising electro positive and negative elements insulated from each other but directly connected or short circuited at one or more points, whereby current will be generated by the action of the salt content of the water passing through the filter upon the electro positive and negative elements of said couple, substantially as described.

2. In an electric water filter, the combination with upper and lower water receiving and holding chambers, arranged one above the other, of an electric couple comprising divided positive and negative elements supported in position between said chambers, a porous partition separating the elements and an electric conductor directly connecting or short circuiting the same, substantially as described.

3. In an electric water filter, the combination with upper and lower water receiving and holding vessels, fitted one upon the other for gravity flow from the upper to the lower vessel, of an electric couple supported between the vessels comprising two porous filter disks, finely divided positive and negative elements arranged respectively on said disks and a conductor extending through the upper disk, substantially as described.

4. In an electric water filter, the combination with upper and lower water receiving and holding vessels, fitted one upon the other for gravity flow from the upper to the lower vessel, of an electric couple supported between the vessels comprising two porous filter disks, zinc fragments and copper turnings arranged respectively on said disks, a conductor extending through said upper disk, and a sand tray supported in said upper vessel above the electric couple, substantially as described.

5. In an electric water filter, the combination with the upper and lower water receiving and holding vessels, fitted one upon the other for gravity flow from the upper receiving vessel to the lower holding vessel, of an electric couple comprising a holder removably supported between said vessels, two porous disks carried on said holder, divided positive and negative elements arranged respectively on said disks and a conductor extending through the upper disk, substantially as described.

6. An electric coupler for water filters comprising finely divided positive and negative elements, a porous partition separating said elements and an electric conductor directly connecting or short circuiting the same, substantially as described.

7. An electric couple for water filters comprising zinc fragments and copper turnings, a porous filter partition of insulating material separating the elements and an electric conductor directly connecting or short circuiting the same, substantially as described.

8. An electric water filter comprising a porous filter partition arranged for the passage of water therethrough and an electric couple formed of positive and negative elements that are short circuited or directly connected electrically and arranged on opposite sides of said porous filter partition.

9. An electric water filter comprising a porous filter partition arranged for the passage of water therethrough and an electric couple formed of divided positive and negative elements electrically connected and arranged closely adjacent and on opposite sides of said porous filter partition, substantially as described.

10. An electric water filter comprising a suitable chamber and an electric couple formed of permeable electro positive and negative elements and a body of filtering material arranged in said chamber to compel the passage of water therethrough, the elements of said couple being directly connected electrically or short circuited at one or more points, whereby current will be generated by the action of the salt content of the water passing through the filter upon said electro positive and negative elements, substantially as described.

11. An electric water filter comprising a suitable chamber, a porous filter partition of unglazed earthenware, arranged in said chamber to compel the passage of water therethrough and an electric couple formed of electro positive and negative elements arranged respectively adjacent and on opposite sides of said partition, said elements being directly connected electrically or short circuited at one or more points, whereby current will be generated by the action of the salt content of the water passing through said partition upon said electro positive and negative elements, substantially as described.

12. An electric water filter comprising upper and lower, water receiving and holding chambers arranged one above the other for gravity flow from the upper to the lower chamber, a porous filter partition of unglazed porcelain interposed between said chambers to compel the passage of water therethrough and an electric couple formed of divided electro positive and negative elements arranged adjacent and on opposite sides of said partition but directly connected electrically or short circuited at one or more points, whereby current will be generated by the action of the salt content of the water passing through said partition upon said electro positive and negative elements, substantially as described.

MELVIN A. BRANNON.

Witnesses:
LILLIAN PRENTICE,
KATHARINE GERLACH.